United States Patent
Lin

(10) Patent No.: US 6,704,387 B1
(45) Date of Patent: Mar. 9, 2004

(54) METHOD AND APPARATUS FOR NORMALIZED BIT COUNTING

(75) Inventor: Xiao Lin, San Jose, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 190 days.

(21) Appl. No.: 09/953,653

(22) Filed: Sep. 11, 2001

(51) Int. Cl.⁷ .............................................. H03K 21/00
(52) U.S. Cl. ............................ 377/33; 377/27; 377/28
(58) Field of Search .............................. 377/33, 27, 28

(56) References Cited

U.S. PATENT DOCUMENTS 6,169,973 B1 * 1/2001 Tsutsui et al. .............. 704/500

* cited by examiner

*Primary Examiner*—Margaret R. Wambach
(74) *Attorney, Agent, or Firm*—Blakely, Sokoloff, Taylor & Zafman LLP

(57) ABSTRACT

A method and apparatus for providing of normalizing a bit count is provided. The method comprises counting bits for a first frame, and normalizing a target bit in a target frame using the bits of the frame. The method then comprises counting to the normalized target bit in the target frame.

25 Claims, 7 Drawing Sheets

METHOD AND APPARATUS FOR NORMALIZED BIT COUNTING

FIELD OF THE INVENTION

The present invention relates to compact disk writing technology, and more specifically, to timing of a write-restart using bit counting.

BACKGROUND

A compact disk recorder writes data to a disc by using its laser to physically burn pits into the organic dye of the disc. When heated beyond a critical temperature, the area 'burned' becomes opaque (or absorptive) through a chemical reaction to the heat and subsequently reflects less light than areas that have not been heated by the laser. A CD-R (compact disk-recordable) or CD-RW (compact disk re-writable) can generally be used in a normal CD player as if it were a normal CD.

By mid-1998 drives were capable of writing at quad-speed and reading at twelve-speed (denoted as '4x/12x') and were bundled with much improved CD mastering software. The faster the writing speed the more susceptible a CD-R writer is to buffer underruns—the most serious of all CD recording errors. A buffer underrun occurs when the system cannot keep up a steady stream of data as required by CD recording. The CD recorder has a buffer to protect against interruptions and slowdowns, but if the interruption is so long that the recorder's buffer is completely emptied, a buffer underrun occurs, writing halts, and most often the recordable CD is irretrievably damaged.

One prior art solution to this problem is to use multi-session CD-ROM drives. On multi-session CD-ROMs, while it is impossible to erase data—once a location on the CD-R disc has been written to, the color change is permanent—there may be multiple write sessions to different areas of the disc. This permits the recording to stop and restart. However, only multi-session compatible CD-ROM drives can read subsequent sessions; anything recorded after the first session will be invisible to older drives. This is disadvantageous, as it is not compatible with the millions of currently available drives.

A new solution to this problem is to use link-less restarting. This permits restarting without the linking area required by multi-session drives. Timing the location of the restart is difficult. Generally, in link-less restart, a particular starting location is identified, and bit counting is used to reach the starting location.

One issue with restarting a session is that the bit counting may be problematic. In the prior art, a 33.8688 MHz crystal is used to generate the EFCK (EFM Bit Clock) in CLV (constant linear velocity) mode. The EFCK is then used to control the WGATE on timing in the restart frame once ESFS (Encode Subcode Frame Sync) is synchronized with SCOR (Subcode Ready Sync) for the target frame. Because there are variations on the spindle motor speed during different read and write processes, counting to the restart bit using a fixed clock EFCK causes inconsistency on the WGATE on timing.

SUMMARY OF THE INVENTION method and apparatus for providing of normalizing a bit count is provided. The method comprises counting bits for a first frame, and normalizing a target bit in a target frame using the bits of the frame. The method then comprises counting to the normalized target bit in the target frame.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for normalized bit counting is described. For CD-R and/or CD-RW write under the traditional CLV method, as a buffer underflow condition occurs, the firmware will stop the writing process. When the buffer underrun has been resolved, the writing is restarted. The write restart uses a bit counting algorithm to count to the target bit (the starting point), at which point the write gate is turned on, and writing is resumed.

Due to the variation in the spindle motor speed among the different read and write processes, the fixed EFCK clock cannot be used to accurately determine the starting point. In order to account for the differential in the motor speed, the bits are counted in the frame prior to the target frame using an encoder channel clock (ECCK). The ECCK is, for one embodiment, higher resolution than the EFM bit clock (EFCK). For one embodiment, ECCK=8×EFCK.

The bit count of the frame before the target frame is normalized with the ideal 588T (since there are 588 bits per frame). This value is used to scale up or down the link start bit count, the point at which the write gate (WGATE) is turned on. The present technique further proposes an approximation mechanism that limits the error of the WGATE ON timing to within ±1T, without requiring the use of a divider.

Figure 1:
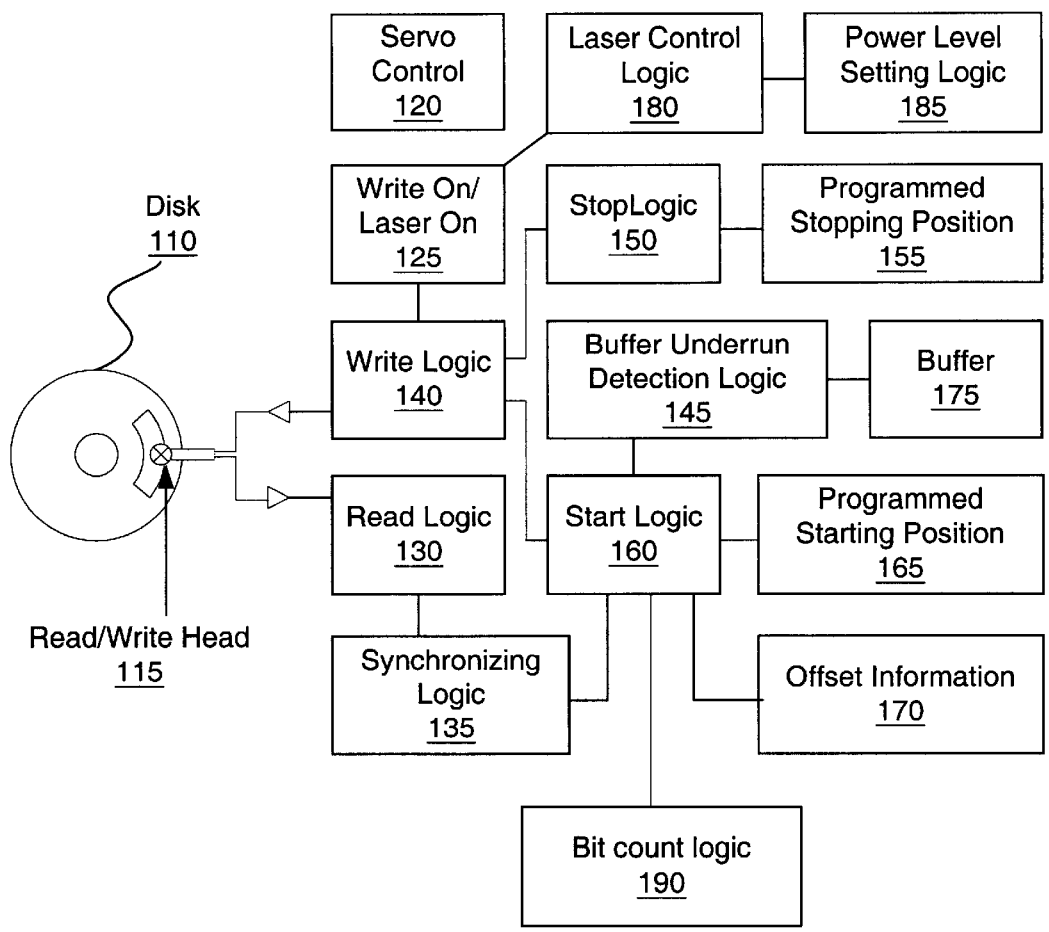
FIG. 1 is a system level block diagram of one embodiment of a compact disc recording system.

FIG. 1 is a system level block diagram of one embodiment of a compact disc recording system. The disk 110 is a CD-R disk, which permits reading and writing to the disk. A read/write head 115 is positioned over the disk 110. The read/write head is designed to read from and write to the disk 110. For one embodiment, the read/write head 115 may be two devices, one designed to read, and one designed to write. The read/write head includes a laser for writing to the disk 110, as is known in the art. The recording laser (not shown) is controlled by write on/laser on logic 125, which turns on the writing laser at a certain time, as will be discussed in more detail below.

Servo control 120 controls the mechanical aspects of the movement of the disk 110 and read/write head 115, as is known in the art.

Write logic 140 writes data to disk 110. Write logic 140 receives data from small buffer (not shown), and after encoding the data, writes the data to disk 110. Write logic 140 is controlled by start logic 160 and stop logic 150. Start logic 160 controls when write logic 140 starts to write, while stop logic 150 controls when write logic 140 stops writing.

Buffer underrun detection logic 145 detects when large buffer 175 is running low on data. Generally, buffer 175 is continuously filled. When the buffer underrun, the buffer underrun detection logic 145 detects that buffer 175 is running low, and may have a buffer underrun, the buffer underrun detection logic 145 passes this information to the stop logic 150, indicating that the stop logic 150 should stop the recording. The stop logic 150 determines when to stop the recording based on the programmed stopping position 155, which is stored in a register. For one embodiment, stop logic 150 stops the recording in the small frame after the buffer underrun detection logic 145 indicates that there is going to be a buffer underrun, at the location indicated by the programmed stopping position.

At the appropriate time, the stop logic 150 indicates to the write logic 140 that writing should be stopped. At that time, the write on/laser on logic 125 turns off or deflects the writing laser.

At a later time, the buffer underrun detection logic 140 may determine that the buffer 175 is sufficiently full that that recording should be restarted, and notify start logic 160. For another embodiment, another signal may indicate that it is time to restart recording. For example, the user may indicate that it is time to restart recording.

Start logic 160 uses read logic 130 to derive a synchronization signal, to synchronize the about-to-be recorded data to the previously recorded data. The start logic 160 uses the synchronizing data from synchronizing logic 135 to start writing new data, using write logic 140.

Start logic 160 determines the starting location based on the programmed starting position 165 and the offset information 170. The offset information 170 compensates for the time between when an area is actually under the read/write head 115 and when the read logic 130 identifies the information. The offset information 170 is determined based a variety of factors, including: a distance from the read/write head 115 to the read logic 130; the time the read logic 130 takes to identify the data being read; and the delay between the time the start logic 160 prompts the write logic 140 to start writing and when the read/write head 115 actually starts to write data to the disk. For one embodiment, the offset information 170 is programmed by the OEM (original equipment manufacturer) who indicates the distance between the read/write head 115 and the read logic 130, while the system determines the time for the read logic 130 to identify the information. The resulting starting point includes a target frame and a target bit at which writing is to restart.

Bit count logic 190 is used to count the bits to the starting point. The bit count logic normalizes the bit count, to adjust for variations in spindle speed. This is described in more detail below. When the starting point is reached, the start logic 160 prompts the write logic 140 to start writing.

Providing a link-less restart mechanism means that the system can stop writing data to disk 110, and restart writing data at the pre-programmed starting point. FIG. 1 is an example of the structure in which the bit normalization logic of FIG. 2 may be included. However, bit normalization may be used for other systems and processes that need to obtain an accurate bit count when the original clock frequencies may have changed.

Figure 2:
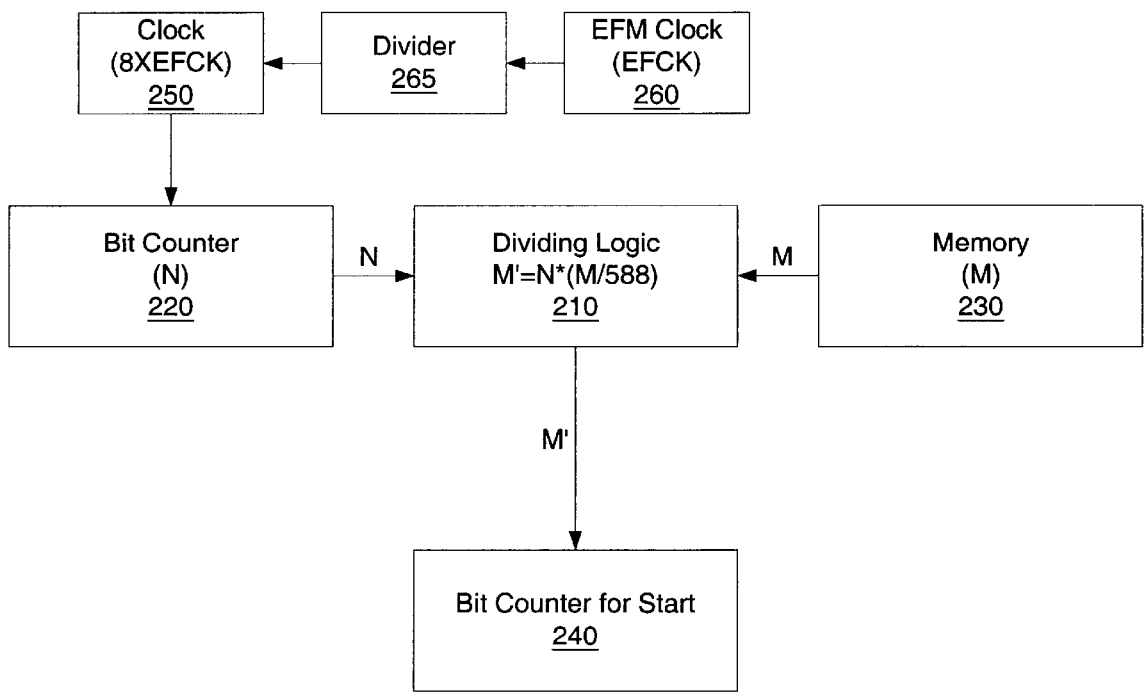
FIG. 2 is a block diagram of one embodiment of the bit normalization logic.

FIG. 2 is a logical block diagram of one embodiment of the bit counting logic. The encoder channel clock (ECCK) 250 is obtained from the EFM bit clock (EFCK) 260. For one embodiment, the EFCK is generated using a crystal. For one embodiment, the crystal is a 33.8688 MHz crystal. For one embodiment, the ECCK is eight times the EFM bit clock (EFCK). Of course, the actual frequencies may be different.

The ECCK 250 is used by frame counter 220 to count the full EFM frame one frame before the target EFM frame (n). The target EFM frame is the EFM frame in which the write-restart is to occur. Frame counter 220 counts EFM frame n−1. Frame counter 220 uses the ECCK clock 250 to count bits. The result of this count is N. If the spindle speed after restart is identical to the original spindle speed, the count N should be 588 EFM clock cycles (and 8×588 ECCK clock cycles), since 588 is the number of bits per EFM frame. In general, as a result of slight movements in spindle speed, the count for N may vary. Generally, counts between 560 and 610 will be expected.

The results of this count are passed to dividing logic 210 along with the original target bit count, M 230. Dividing logic 210 calculates the adjusted target bit count.

The output of dividing logic 210 is M' the normalized bit count for the starting point. This is then passed on to the bit counter 240 used to count to the starting point.

Figure 3:
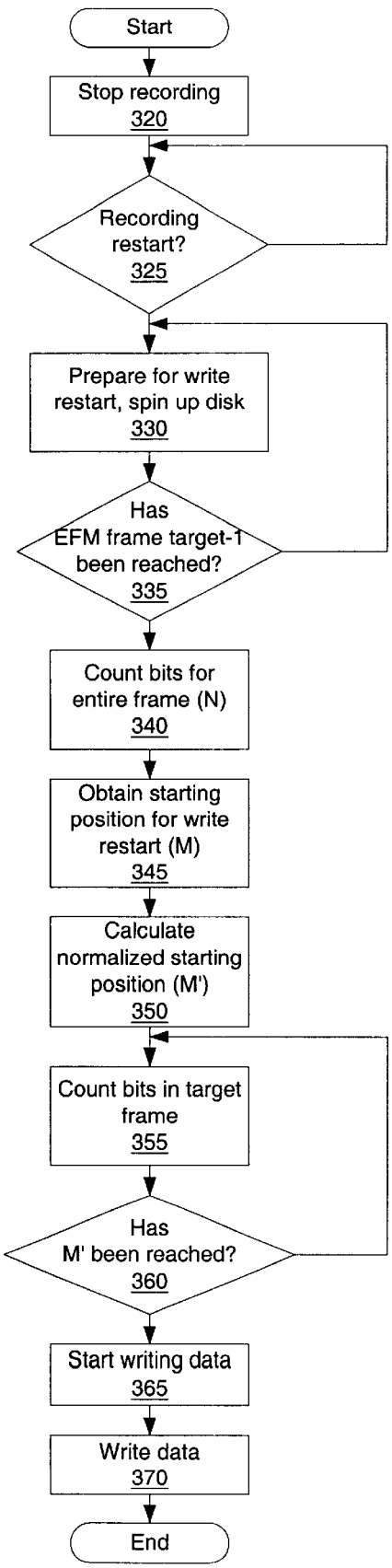
FIG. 3 is a flowchart of one embodiment of the write-restart process using normalized bit counting.

FIG. 3 is a flowchart of one embodiment of the write-restart process using normalized bit counting. The process starts at block 310, when the system is writing data to a disk.

At block 320, the process stops recording. As discussed in copending application Ser. No. 09/953,748 this may be a reaction to a prospective buffer underrun. However, recording may stop as a result of other factors, such as shock or other track loss situations.

At block 325, the process determines whether write restart has been initiated. Writing may be restarted, in a buffer underrun situation, when the buffer is refilled. In other situations, the writing may restart when the problem is remedied. For one embodiment, a user proactively restarts recording. Although this is shown as a decision loop, it is in fact input driven. Thus, the process is not activated until the write restart process has been initiated.

At block 330, the disk is spun up, and other write restart mechanisms take place. The steps needed to start recording are known in the art.

At block 335, the process determines whether the EFM frame prior to the target frame has been reached. The EFM frame prior to the target frame (n−1) is used to calculate values. Thus, after the disk is spun up, at block 330, the process seeks the n−1 EFM frame. If the frame has not yet been reached, the process returns to block 330, to continue the write restart process.

If the n−1 EFM frame has been reached, the process continues to block 340.

At block 340, bits are counted for the entire frame. For one embodiment, the encoder channel clock (ECCK) is used to count bits.

At block 345, the starting position is retrieved from memory. Note that this may be done at any time, after the recording restart, at block 325. As discussed in Ser. No. 09/953,748, if the stop was a result of a buffer underrun, the starting position is a preset position. If the recording stop was a result of an error, the stopping position is known.

Based on the stopping position, a starting position may be calculated. For another embodiment, the stopping position is used as the starting position. For one embodiment, an offset may be added to the stopping position to account for signal delay—from Write Gate On to actual write start—and for potential overlap.

At block 350, the normalized starting position is calculated. The normalized starting position is:

M'=M*N/588, where 588 is the number of bits in an EFM frame. The value of N is the number of ECCK clock cycles it took to count the entire n−1 EFM frame. Thus, the normalized starting position is adjusted by the amount of clock slippage. Generally, clock slippage is a result of different spindle speeds.

At block 355, the bits in the target frame are counted.

At block 360, the process determines whether the M' bit, the normalized starting bit, has been reached. If the M' bit has not yet been reached, the process returns to block 355, to continue counting to the target frame.

If the M' bit is reached, the process continues to block 365.

At block 365, writing is started. The process of starting to write is known in the art. In general, the write gate (WGATE) is turned on, and the laser is turned on to write. The process then continues writing, at block 370. This continues until it is again stopped, or the disk has been completed. The process then ends at block 375.

Figure 5:
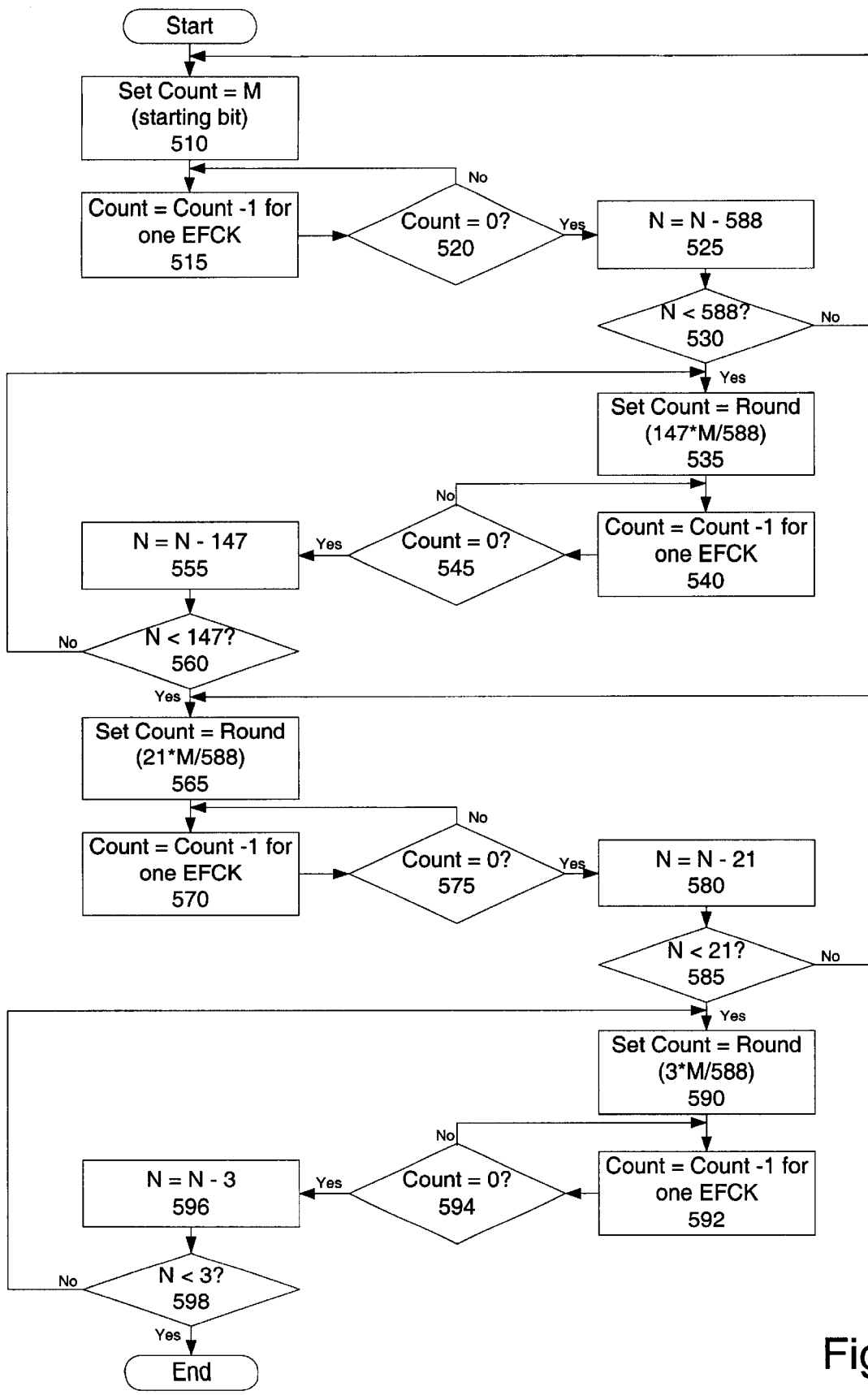
FIG. 5 is a flowchart of one embodiment of the down-counter.
Figure 6:
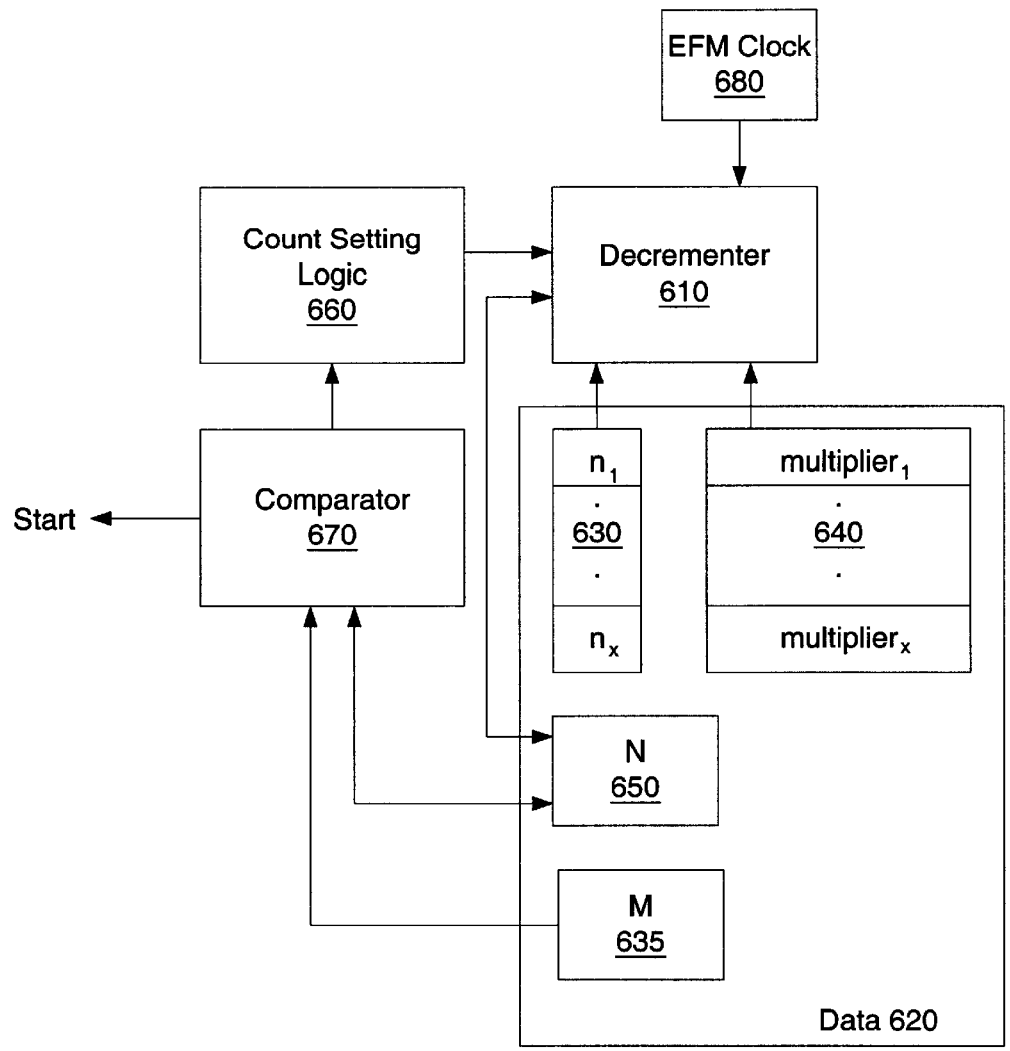
FIG. 6 is a block diagram of one embodiment of the approximation logic used for bit normalization.

However, implementing this process using an actual divider 210 is difficult, since the result of the division is needed immediately after N is obtained. Additionally, the system would need a separate hardware element to perform this division. Therefore, FIGS. 4–6 illustrate a method of implementing an approximation to this dividing methodology, without requiring significant additional hardware.

Figure 4:
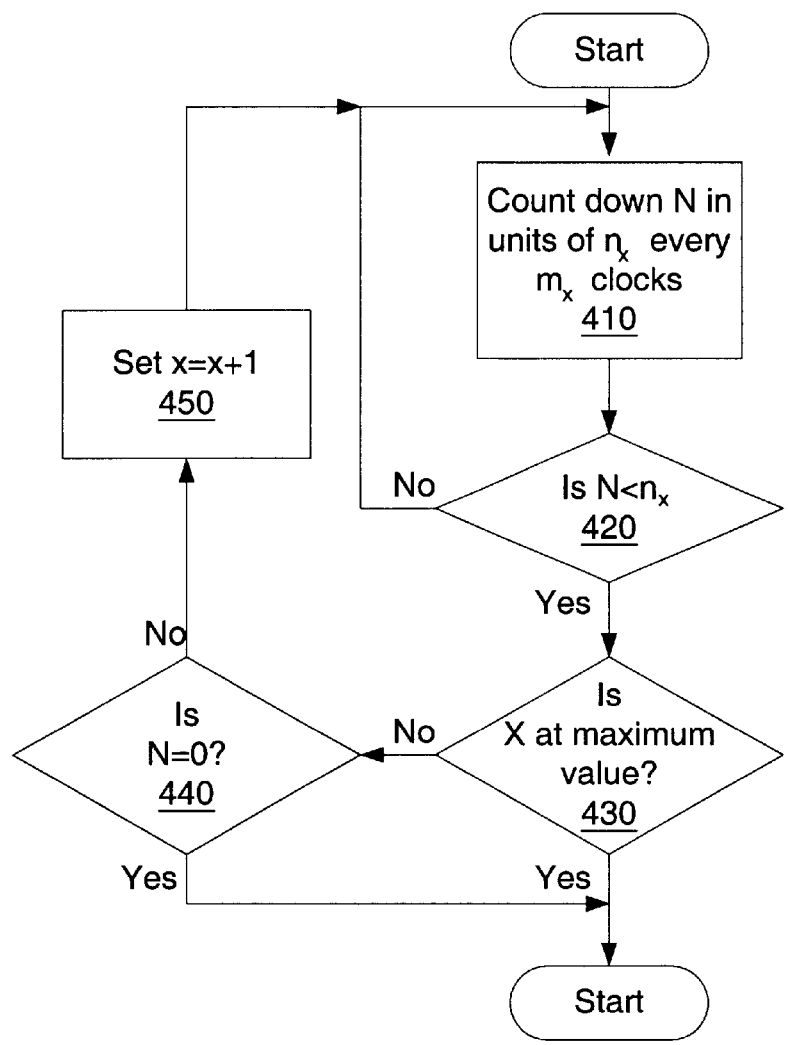
FIG. 4 is a flowchart of one embodiment of normalized bit counting.

FIG. 4 is a flowchart of one embodiment of normalized bit counting. This process starts after the bits are counted in the n−1 frame, as described above with respect to block 340. The result of that count is the value N, which is the number of clock cycles counted during the entire frame. For one embodiment, the clock used for counting N is the encoder channel clock (ECCK), which is a multiple of the EFM bit clock (EFCK). For one embodiment, the frequency of the ECCK signal is eight times the frequency of the EFCK signal. Thus, assuming the perfect spindle speed, since there are 588 bits per frame, the value of N=8*588, thus N=4704. However, since the spindle speed does not precisely match the previous speed, it is expected that the value of N would vary from the "perfect" value.

At block 410, a countdown from N is initiated. Since N is obtained by counting a full EFM frame using the encoder channel clock, N can be expressed as:

$$N=n_1*m_1+n_2*m_2+n_3*m_3+n_4*m_4+n_5,$$

where $n_x$ are non-negative integers, and $m_x$ are factors of N. As stated above, M', the normalized target bit, can be expressed as:

$$M'=N*M/588$$

Thus, the countdown from N is, every $n_x$ clock cycles, $m_x$ units are subtracted from the value of N. See the table below for exemplary values.

| x | $m_x$ | $n_x$ |
|---|---|---|
| 1 | 588 | M |
| 2 | 147 | Round (147*M/588) |
| 3 | 21 | Round (21*M/588) |
| 4 | 3 | Round (3*M/588) |

At block 420, the process determines whether the value is N is below the current $n_x$ value. If not, the process continues back to block 410, to continue counting. If so, the process continues to block 430.

At block 430, the process determines whether the value of X is at its maximum. Note that although four factors are shown, i.e. X=1 . . . 4, the range of value may be increased or decreased. If X is at a maximum, the process has finished counting down to the target bit, and thus ends. At this point, the write gate is turned on, and writing is restarted. If the value of X is not at a maximum, the process continues to block 440.

At block 440, the process determines whether the value of N is zero. If so, the target bit has been reached, and the process ends. Otherwise, X is incremented by one, and the process returns to block 410, to continue counting down.

FIG. 5 is a detailed flowchart of one embodiment of implementing the approximating down-counter. The example of FIG. 5 illustrates the numbers for the following table:

| x | $m_x$ | $n_x$ |
|---|---|---|
| 1 | 588 | M |
| 2 | 147 | Round (147*M/588) |
| 3 | 21 | Round (21*M/588) |
| 4 | 3 | Round (3*M/588) |

Again, this process starts after the value of N, the normalized bit count of a frame prior to the target frame has been counted. Note that although we generally refer to the frame prior as the n−1 frame, it may be further removed from the target frame.

The Count is initially set to M (block 510), and then for each EFCK signal, the count is decremented by one (block 515), until the Count reaches zero (block 520). When the count reaches zero, 588 is subtracted from N (block 525). The process then determines whether the value of N is below 588 (block 530). If not, the process continues to block 510, where Count is set equal to M again. If the value of N is below 588, the process continues to block 535.

The process then repeats, with the Count set to Count= Round (147*M/588), and when count is zero, subtracting 147 from N. This is shown in blocks 535 to 560. Again, the process repeats, as shown in blocks 565 through 585, with the values set to Count=Round (21*M/588), and when count is zero, subtracting 21 from N.

The final repetition occurs with Count =Round (3*M/ 588), and when count is zero, subtracting 3 from N. When N is less than three, at block 596, the process deems the count completed.

This process provides an approximation of counting to a normalized M'. The values chosen here were selected for their low error rates. However, they are arbitrarily chosen. An alternative set of one or more subtraction cycles may be executed.

The error distribution using the above described process is as follows:

$$M' = n_1 \cdot M + n_2 \cdot 147 \cdot n_2 \cdot \frac{147 \cdot M}{588} + n_3 \cdot \frac{21 \cdot M}{588} + n_4 \cdot \frac{3 \cdot M}{588} + n_5 \frac{M}{588},$$

where $n_1 = INT(N/588)$, $n_2 = INT[(N-588 \cdot N_1)/147]$, $n_3 = INT[(N-588 \cdot n_1)/21]$, and $n_4 = INT[(N-588 \cdot n_1)/3]$, thus the value of M' can be approximated by:

$$M' = n_1 \cdot M + n_2 \cdot ROUND\left(\frac{147 \cdot M}{588}\right) +$$

$$n_3 \cdot ROUND\left(\frac{21 \cdot M}{588}\right) + n_4 \cdot ROUND\left(\frac{3 \cdot M}{588}\right)$$

Designating the terms on the right hand side of the Equation as L1, second term L2, etc, all the way to L5.

Under all circumstances, with the approximation above,
There is no error in L1, so $\Delta L1=0$;
$n_2 \leq 3$, therefore $\Delta L2 \leq \pm(3 \cdot 0.5) = \pm 1.5$;
Similarly, $\Delta L3 \leq \pm 3, \Delta L4 \leq \pm 3, \Delta L5 \leq \pm 1$.

Thus, the maximum error in M' using this counting method will be $$\Delta M' = \sum_{i=1}^{5} \Delta Li \leq \pm 8.5$$

Since the encoder channel clock is 8 times the bit clock frequency, the error in unit of bits or T's is $\pm 8.5/8 = \pm 1.0625$.

Figure 7:
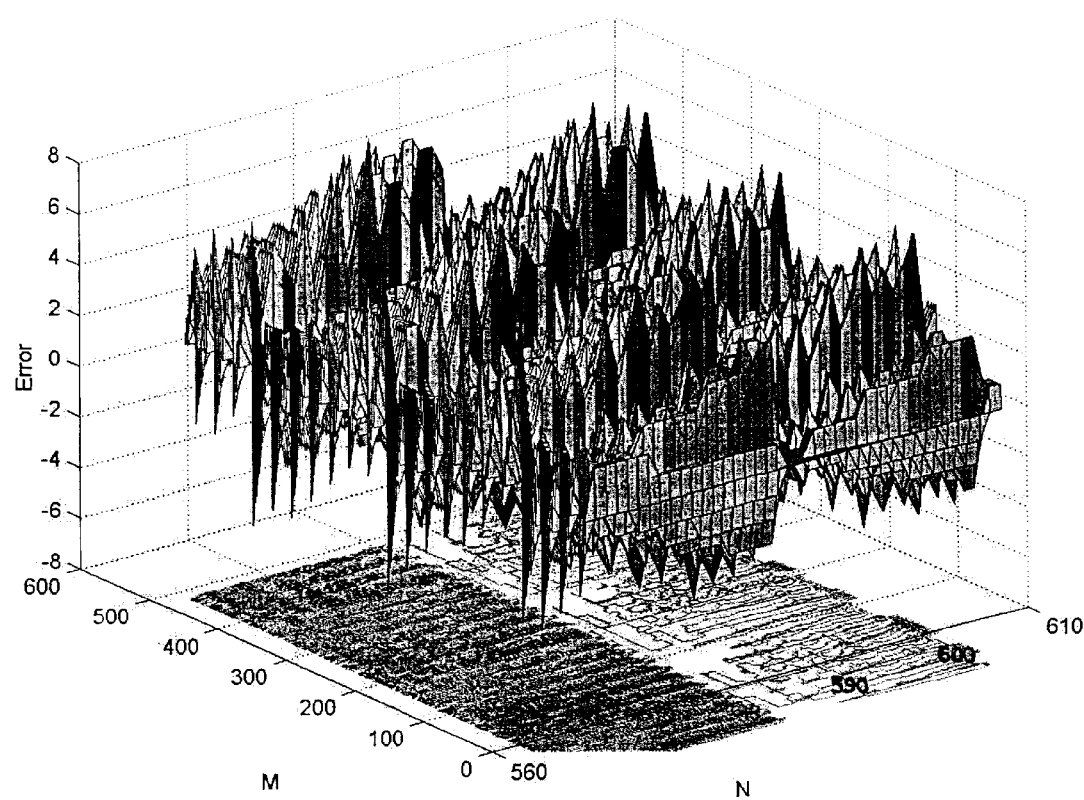
FIG. 7 illustrates an exemplary error distribution for the approximation used for bit normalization.

Thus, using the numbers above with the approximation leads to a maximum of one clock unit error. FIG. 7 illustrates a simulation showing the relationship of the error, in ECCK, versus the link starting point (M), versus the normalized EFM frame length (N in EFCKs). As can be seen, the error is less more than 8 ECCK, which is 1 EFCK.

FIG. 6 is a block diagram of one embodiment of the approximation logic used for bit normalization. The count setting logic 660 calculates the count 630 for each cycle, as described above. The count setting logic 660 has as inputs M, the target bit, as well as the multipliers 640. The output of the count setting logic 660 is an input to decrementer 610. Decrementer decrements the count by one, on each clock, EFCK 680. Comparator 670 determines when the remaining count is equal to zero. If so, the decrementer 610 subtracts the current value of $m_x$ from the value of N 650. The comparator further determines whether the value of N is less than the value of $m_x$. If not, the comparator 670 again triggers the count setting logic 650 to set the count.

If the value of N is less than the value of $m_x$, the comparator 670 determines whether all of the cycles have been completed. If so, the comparator outputs the "target bit reached" signal. Otherwise, the comparator increments the value of X, and passes that data to the count setting logic 660, which generates the next count, and continues this process.

In this way, the approximation logic reaches the target bit, without requiring the instantaneous availability of the modified frame bit count, N.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of normalizing a bit count in an EFM frame, the method comprising:
   counting bits for a first frame;
   normalizing a target bit in a target frame using the bits of the frame; and
   counting to the normalized target bit in the target frame.

2. The method of claim 1, wherein the first frame is a last frame before the target frame.

3. The method of claim 1, wherein normalizing comprises multiplying the target bit by N/588, wherein N is the number of clock cycles in the first frame counted using an EFM clock.

4. The method of claim 1, wherein normalizing and counting comprise:
   counting down to the bits counted in the first frame, in units of factors of the bit count, every clock cycle.

5. The method of claim 1, wherein the normalization is approximated by counting down from clock cycles in the first frame ("N") to zero.

6. The method of claim 5, further comprising:
   counting down from N, using factors of 588, the number of bits in an EFM frame.

7. The method of claim 5, wherein N is counted using an encoder channel clock, which is a multiple of an EFM clock.

8. The method of claim 7, wherein the counter is a rounded number following the equation: Round (Factor*M/588), where Factor is a factor of 588, 588 is the bit count in an EFM frame, and M is the target bit.

9. The method of claim 8, wherein the factors are 588, 147, 21, and 3.

10. A method of normalizing a bit count comprising:
    generating a count (N) for a first EFM frame prior to a target EFM frame;
    counting down to a target bit by counting down from the bit count (N) in the target frame.

11. The method of claim 10, wherein the count N is generated using an encoder channel clock, which is a multiple of an EFM bit clock.

12. The method of claim 11, wherein the counting down comprises:
    counting down by a factor of a bit count for the EFM frame, from N, until N is below the factor.

13. The method of claim 12, further comprising:
    determining that N is below the factor; and
    determining if there are other smaller factors of N for the counting; and
    if so, counting down from N by a next largest factor.

14. The method of claim 12, further comprising:
    counting down periodically, the period set based on the encoder channel clock, the current factor (F) of the EFM frame, and the target bit (M).

15. The method of claim 14, wherein the period is:
    (Round (F*M/588))*EFM clock cycle.

16. A method of normalized bit counting to a target bit in a target frame, the method comprising:
    (a) generating an adjusted bit count for a prior frame prior to the target frame;
    (b) at each set of clock cycles, subtracting a value from the adjusted bit count;

(c) when the adjusted bit count is below the value, selecting a new value; and continuing to repeat steps (b) and (c) until the value is a lowest value, at which time the target bit is deemed found.

17. The method of claim 16, wherein the adjusted bit count is a count of clock cycles using an encoder channel clock, which is a multiple of an EFM clock.

18. The method of claim 16, wherein the set of clock cycles is:

(Round (F*M/588))*EFM clock cycle.

19. The method of claim 16, wherein the values are 588, 147, 21, and 3.

20. An apparatus for normalized bit counting comprising:

a bit counter to generate an adjusted bit count N for a prior frame prior to the target frame;

a count setting logic to determine what value to count down by;

a decrementer to decrement the adjusted bit count by the value identified by the count setting logic; and a comparator to determine when the adjusted bit count is below the value.

21. The apparatus of claim 20, further comprising:

an encoder channel clock, which is a multiple of an EFM bit clock, the encoder channel clock used to generate the count N.

22. The apparatus of claim 21, further comprising:

the count setting logic determining if there is a value below the current value; and if so, the decrementer to decrement the adjusted bit count by a next highest value identified by the count setting logic.

23. The apparatus of claim 22, further comprising:

the decrementer further to count down periodically, the period set based on the encoder channel clock, the current factor (F) of the EFM frame, and the target bit (M).

24. The apparatus of claim 23, wherein the period is:

(Round (F*M/588))*EFM clock cycle.

25. The apparatus of claim 23, wherein the factors are: 588, 147, 21, and 3.

* * * * *